Hamer & Lippincott,
Brick Mold.
Nº 49,105. Patented Aug. 1, 1865.
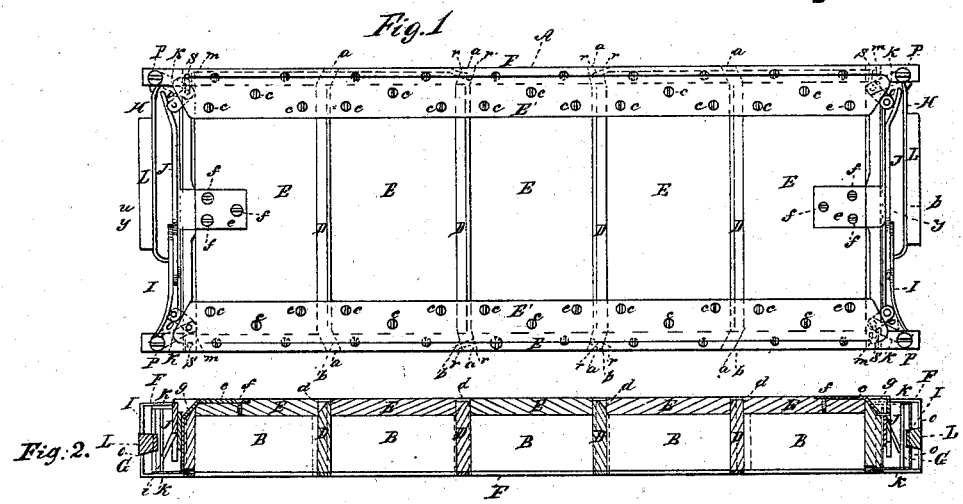
Witnesses:
Alfred Taylor
Charles Geiss
Inventors:
James A. Hamer
Thomas Lippincott
By their Atty.
Stephen Ustick

UNITED STATES PATENT OFFICE.

JAMES A. HAMER AND THOMAS LIPPINCOTT, OF PHILADELPHIA, PA.

IMPROVED BRICK-MOLDS.

Specification forming part of Letters Patent No. 49,105, dated August 1, 1865.

*To all whom it may concern:*

Be it known that we, JAMES A. HAMER, of the city of Reading, in the county of Berks and State of Pennsylvania, and THOMAS LIPPINCOTT, of the city and county of Philadelphia, and State of Pennsylvania, have invented a new and useful Improvement in Brick-Molds; and we do hereby declare that the following is a full, clear, and exact description of the construction and operation of the same, reference being had to the annexed drawings, making a part of this specification, in which—

Figure 1 is a face view of the combined mold turned bottom upward before its expansion for the discharge of the bricks. Fig. 2 is a vertical longitudinal section of the same, the red lines indicating the positions of the end pieces, C C, and partitions D D and D' D' when the mold is expanded. Fig. 3 is an end view of the mold corresponding to Fig. 1. Fig. 4 is a side elevation of the same. Fig. 5 is an end view of the mold when expanded, in which the levers J J and parts attached to the same assume different positions than those they have in Figs. 1, 2, 3, and 4. Figs. 6 and 7 are a face and edge view of one of the plates $k'$. Figs. 8 and 9 are similar views of one of the pieces O. Figs. 10 and 11 are like views of one of the pieces P. Figs. 12 and 13 are similar views of one of the levers J. Figs. 14 and 15 are an edge and face view of one of the locking-strips M. Fig. 16 is a longitudinal section of one of the partitions D. Fig. 17 is a side view of one of the rods G. Fig. 18 is a similar view of one of the sleeves $o$. Figs. 19 and 20 are views at right angles with each other of one of the bell-cranks Q.

Like letters in all the figures represent the same parts.

The nature of our invention and improvement consists in a combination and arrangement of levers and parts attached to the same with the sides and end pieces of the combined mold in such a manner as to effect the expansion of the compartments of the latter and elevate the bottom of the mold to assist in the discharge of the bricks.

It also consists in combining and arranging locking-strips with the side pieces of the mold, which prevent the springing out of the said pieces during the molding of the bricks.

To enable others skilled in the art to which our improvement appertains to make and use the same, we will proceed to describe its construction and operation.

A is the combined mold, which has five compartments, A', of the dimensions of the bricks to be molded.

B B are the side pieces of the mold, and C C the end pieces.

D D are the middle partitions, and D' D' the outer partitions. They have bevel tenons or projections $a$ at their ends, which fit in corresponding slots $b$ in the side pieces, B B.

The bottom of the mold is composed of the wooden cross-pieces E E E E E, of the dimensions of the compartments A', which they severally cover, and the metal longitudinal strips E' E', which fit in rabbets across the former at the ends of the same, and are confined by means of the screws $c$, as represented in Fig. 1.

The bevels $d$ on the edges of the partitions D D and D' D' are for the purpose of relieving the edges of the bottom pieces, E, as they are withdrawn from the mold during the expansion of the same. The strips E' E' are in contact with the bottom edges of the different pieces of the mold during its contracted state, as seen in Figs. 1, 2, 3, and 4.

There are bent plates $e\ e$ sunk in the end cross-pieces, E E, and confined by means of screws $f$. The outer and projecting ends of the said plates rest on the inclines $g\ g$ of the end pieces, C C, and are raised by the same in the outward movement of the said pieces C C, to elevate the bottom of the mold above the bricks to facilitate their discharge.

F F are facing-strips, which are confined to the edges of the side pieces, B B, by means of the screws $h$. The said strips are in the form of links, which extend at each end beyond the ends of the side pieces a sufficient distance to form spaces $i$, to permit the outward movement of the pieces C C during the expansion of the mold and the rods G G G G, which are connected at their ends with the said strips, as represented in the drawings.

There are rods H H and I I, connected at one end by means of suitable openings or eyes with the rods G and at their other end with the levers J J by means of the pivots $j$. The said levers have fulcrum-pins $k$, which project at right angles from the plates $k'$, that are fastened to the end pieces, C, by means of the screws $l$.

K K K K are bars for holding the end piece, C, at each end of the mold in its place, and assisting the outward movement of the same during the expansion of the mold. They are connected at one end to the ends of the shafts G, inside of the facing-strips F, by means of suitable openings, and at their other end to the edges of the end piece, C, by means of the perpendicular rods $m\ m$, which pass through the said end piece.

There are plates $n\ n$ sunk in the inner side of the piece C, and confined by means of screws to cover slots for the reception of bell-cranks, which we will hereinafter describe. The said plates are turned over at their top and bottom edges so as to cover the edges of the end pieces, C, under the bars K.

In order to form an easy connection between the shafts or rods G, rods H H and I I, and bars K, we provide the said shafts with the sleeves $o$, which come respectively between the ends of the said rods and bars, as represented in Figs. 2, 3, and 4. The shafts are riveted at one end, and are fastened at the other end by means of the screws $p$, so that they may be detached readily at any time in case of repairs. One of the shafts is represented in detail in Fig. 17, and one of the sleeves in Fig. 18. Instead of connecting the bars K with the edges of the pieces C C, as described, they may be connected to their outer flat surfaces, if preferred, in any convenient manner.

L L are handles for the purpose of carrying and turning the mold. They are confined to the rods H H by means of screws.

M M M M are strips for the purpose of locking the side pieces, B B, to prevent the springing out of the same during the filling of the mold with clay. They have an easy fit in longitudinal grooves in the said side pieces, and are held therein by the short plates N, which are confined by means of screws $q$ to the outer flat surfaces of the side pieces. The inner ends of the strips M have an angular turn inward, which, during the inward motion of said strips, pass under the projections $r$ and partly in the cross-slots $r'$ of the partitions D D, which have the same angle as the ends of the strips, so as to effectually lock the said side pieces by the time the levers J J have reached their downward position, as represented in Figs. 1, 2, 3, and 4. One of the strips M is shown detached from the mold in Figs. 14 and 15. The projections or lugs $r$ and slots $r'$ are shown in detail in the longitudinal section of one of the partitions D in Fig. 16.

At each end of the mold there are pieces O and P, which have a joint connection at one end to one arm of the bell-cranks Q Q, respectively, that work in slots in the ends of the end piece, C C, and have a partial turn on the rods $m$. The other end of the bell-cranks have likewise a joint connection with the outer ends of the lock-strips M by means of the pins $s$, which extend into the perpendicular slots $t$. The pieces O P are operated to impart a vibratory movement to the strips M by means of the cams $u$ on the inner side of the lever J. The said cams are clearly shown attached to the levers in Figs. 12 and 13. The pieces O P have pins $v$, which move in slots $w$ in the plates $k'$, to guide the said pieces O P in their movements back and forth.

The operation is as follows: After the mold has been filled with clay it is turned bottom upward on the floor or yard in its contracted state, as seen in Figs. 1, 2, 3, and 4. The operator then takes hold of the handles of the levers J J and brings the latter into a perpendicular position, as seen in Fig. 5. The levers, in coming into this position by their action on the rods H H and I I, expand the side pieces, B B, of the mold, which action, by the peculiar connection of the partitions D D and D' D' with the said side pieces, B B, by means of the bevel-tenons and mortises or slots above described, causes said partitions to expand each way from the center of the combined mold, thus enlarging all the compartments A' except the end ones, which are enlarged in the same direction by the action of the rods K by virtue of their connection with the side and end pieces of the mold, as described, the movement of the side pieces necessarily giving an outward motion to the end pieces, the pieces K turning freely on the vertical rods G and $m$. At the commencement of the upward movement of the levers J J the cams $u$, acting on the inclines $x$ of the pieces O P, cause a central movement to the latter, which gives a partial turn to the bell-cranks Q, and thereby an outward movement of the locking-strips M, by which their inner ends are disengaged from the angular lugs $r$ and slots $r'$ of the partitions D D, so as to allow a free expansion of the mold. The angular turn to the inner ends of the said lock-strips M favor this action after the side pieces, B B, have commenced moving outward. In consequence of the outward movement of the end pieces, C C, of the mold, their inclines $g\ g$, acting on the bent pieces $e\ e$ on the outer bottom pieces, E E, elevate the whole series of said pieces above the faces of the bricks to allow their free discharge from the chamber A'. After the mold has been expanded, as above described, it is lifted from the bricks, and the levers J J are turned into their horizontal position to contract the mold for another charge of clay, the pins $y\ y$ in the levers resting on the bent pieces $e\ e$, attached to the end cross-pieces, E E, of the bottom of the mold. By this reverse movement of the levers all the parts connected therewith are also reversed and assume the positions seen in Figs. 1, 2, 3, and 4, thus contracting the mold for another charge of clay, and at the same time locking the side pieces, B B, by means of the strips M, to prevent the springing out of the former, as above described.

The combination and arrangement of the partitions D D and D' D' with the side pieces, B B, by means of the bevel-tenons *a* and mortises or slots *b* are essentially the same as described in the patent of James A. Hamer, January 28, 1862.

Having thus fully described our improvement in brick-molds, what we claim therein as new, and desire to secure by Letters Patent, is—

1. The combination and arrangement of the levers J J and rods H H and I I with the side pieces, B B, and end pieces, C C, of the combined mold, for the expansion and contraction of the said pieces B B and partitions D D and D' D', substantially in the manner and for the purposes above set forth.

2. Combining the rods K with the end pieces, C, and side pieces, B, for opening and closing the said end pieces, substantially as described, and for the purpose specified.

3. The combination of the lock-strips M with the side pieces, B B, and partitions D D, substantially in the manner and for the purpose above described.

4. The combination of the levers J J with the lock-strips M by means of the cams *u*, sliding pieces O P, and bell-cranks Q, substantially as described, and for the purpose specified.

In testimony that the above is our invention we have hereunto set our hands and affixed our seals this 21st day of June, 1865.

JAMES A. HAMER. [L. S.]
THOMAS LIPPINCOTT. [L S]

Witnesses:
HILLES LIPPINCOTT,
GEORGE PRINTZ.